Figure 1:
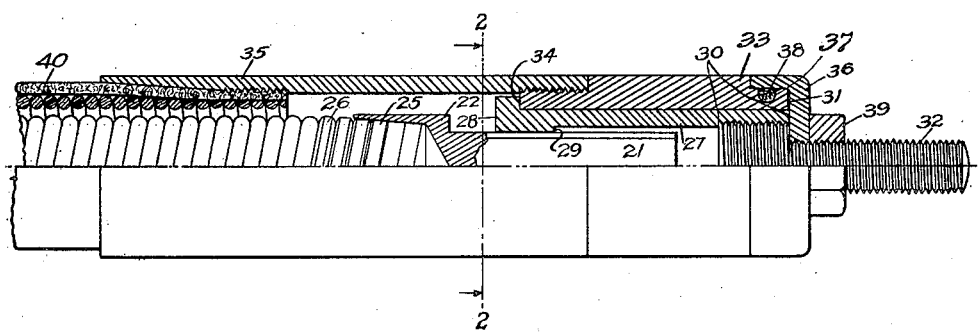

INVENTOR
Winfred W. Elliott
BY C. E. Beach,
ATTORNEY.

Patented Oct. 31, 1922.

1,433,537

UNITED STATES PATENT OFFICE.

WINFRED W. ELLIOTT, OF JOHNSON CITY, NEW YORK, ASSIGNOR TO HIMSELF AND ARTHUR H. SHEAR, OF BINGHAMTON, NEW YORK, COPARTNERS.

FLEXIBLE SHAFT TERMINAL.

Application filed July 23, 1920. Serial No. 398,330.

*To all whom it may concern:*

Be it known that I, WINFRED W. ELLIOTT, a citizen of the United States, residing at Johnson City, county of Broome, and State of New York, have invented certain new and useful Improvements in Flexible Shaft Terminals, of which the following is a specification.

This invention relates generally to flexible shaft terminals, and especially appertains to means of attachment of the extremities of such shafts,—particularly those used in driving buff wheels, grinders and other appliances the use of which is likely to involve the presence of abrasive dust or flyings.

Prior terminals for such shafts have embodied a slip tongue of approximately semicircular cross section, together with a socket having a recess of like outline with which such tongue engages. In using such terminals it has been found that the entire driving torque is concentrated at a single point, i. e., one of the edges of the flat side, thus causing excessive wear of such edge which, when localized, results in the tongue catching in the socket through which it should freely slide; and, in any event, such wear soon results in objectionable looseness of the tongue in its socket which can be remedied only by the replacement of one or both of the parts.

It is well recognized, that if such a tongue catches in its socket when the shaft is subjected to bending during the running thereof, such shaft will be excessively strained if not permanently injured to a serious extent; and that excessive looseness of such a tongue in its socket will result in objectionable chattering and jumping of the shaft during the use thereof.

When such terminals have been employed in the presence of abrasive dust or flyings,— as when used for the operation of grinders and buff wheels—rapid deterioration of wearing surfaces has resulted from the admission thereto of such dust and flyings.

The manufacture of such terminals has heretofore been difficult and expensive, both because of the difficulty of producing a socket having a recess of half round cross section by mean of the facilities ordinarily available for such work, and because of the complex character of the means which have heretofore been employed for the purpose of preventing the entrance of dust into the bearing surfaces.

An object of this invention is to provide a form of slip tongue for such shaft terminals which will greatly decrease wear and consequent likelihood of catching in the socket, and which will substantially decrease the amount of looseness—and consequent opportunity for chattering and backlash— which would result from a given amount of wear of the parts.

Another object is to provide simple and effective means for excluding dust and flyings from the bearings of such terminals.

Another object is to provide terminals, of the type indicated, which can be economically manufactured and assembled, which require repairs and replacements of minimum cost and frequency, and which can readily be taken apart for purposes of inspection, cleaning, lubrication and repairs.

Other purposes will in part be obvious and will in part be hereinafter more fully pointed out.

The improved slip tongue structure of this invention comprises a tongue and a socket, said tongue and the recess of said socket having two or more driving faces—such as would be afforded by a triangular, rectangular or hexagonal cross section—such driving faces being disposed in substantial symmetry with the center of rotation thereof, and the corners of such tongue being rounded so as to conform to arcs described from said center of rotation.

For the purposes of transmitting the driving torque therebetween and of affording needed strength, a suitable portion of the length of the walls of the end of the recess in the socket into which the tongue is introduced is flattened to conform with the driving faces of said tongue, and the remaining length of said recess is circular in cross section and conforms to the rounded corners of said tongue, so as to afford suitable support thereto and to thereby assist in maintaining said tongue in suitable alignment with the flattened walls of said socket. Inasmuch as the cost of producing the flattened portion of the recess increases in direct proportion to the length thereof, and is much greater than the cost of producing the portion of said recess having circular cross section, the improved construction described effects a distinct economy in the cost of manufacture.

The casing of the terminal is made of overlapping pieces which are connected by tightly fitting screw threads, and the joint between such casing and the projecting end of the driving member is covered by a cup-shaped cap which is securely attached to said member, and the walls of which cap overlap the end of said casing.

A groove is formed in the portion of said casing which is overlapped by the walls of said cap, and a ring of suitable resilient packing material—such as felt—is placed in said groove. Such ring serves to exclude dust and flyings from the bearing surfaces, while not appreciably increasing the friction between the moving and relatively stationary members of the terminal.

The cap is secured to the driving member by a suitable threaded connection, and is supported against a shoulder of said member so as to prevent setting thereof too tightly against the end of the casing.

The packing ring is inexpensive and may be readily replaced, and because of the simple form and arrangement of the parts— the entire terminal may be inexpensively manufactured and assembled and may be readily taken apart and put together again for purposes of inspection, cleaning, lubrication and repairs.

In order to enable this invention to be more readily understood, an embodiment thereof is shown in the annexed drawing and hereinafter described, but this invention is not limited to the particular arrangement shown and hereinafter described, as parts may be added or omitted or the form thereof may be altered without departing from the spirit of this invention.

In the accompanying drawing—

Figure 2:
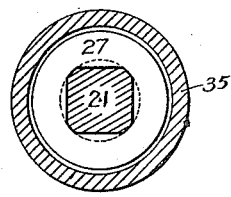

Figure 1 is an elevation of a terminal embodying this invention, the part above the horizontal center line being shown in section;

Fig. 2 is a section on the line 2—2 of Fig. 1; and

Figure 3:
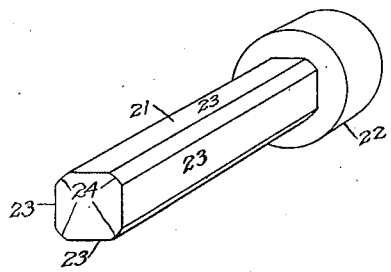

Fig. 3 is a perspective view of the tongue 21 and its enlarged end or head 22.

Like reference characters denote similar parts throughout.

The tongue 21 shown in Figs. 1 and 3 has the head 22 formed at one end thereof; said tongue having the flat faces 23 so disposed as to provide a rectangular cross section, said faces being connected by the rounded corners 24.

The head 22 has formed therein a suitable tapered recess 25 into which an end of the flexible core 26 is firmly secured.

The socket 27 has an opening therethrough, one end of said opening being so formed as to provide a recess for receiving the tongue 21 and the other end of said opening being threaded for a purpose which will be hereinafter more fully set forth.

The portion of the opening through the socket 27 which extends from the end 28 to the shoulder 29 thereof has a cross section corresponding to that of the tongue 21, as most clearly indicated by Fig. 2; and said portion of such opening is of such length as to provide adequate strength for the transmission of the desired torque between said tongue and said socket.

The portion of said socket opening which extends from the shoulder 29 to the threaded portion 30 thereof is circular in cross section, as indicated by the dotted line of Fig. 2; and said portion of such opening is of such length that, when taken with the portion of said opening which extends between the end 28 and the shoulder 29, a recess is provided between said end 28 and the threaded portion 30, which recess is of sufficient depth to receive the tongue 21.

The circular portion of such recess is concentric and in alignment with the rectangular portion thereof, and the radius of such circular portion is substantially identical with the radii of the rounded corners of said tongue, so that said recess will snugly engage said tongue while freely permitting said tongue to slide lengthwise therethrough.

In the manufacture of the socket 27, a hole is bored therethrough, which hole is slightly smaller than the perpendicular distance between opposite faces of the tongue 21. Said hole is then counterbored from the end 31 of said socket to the shoulder 29, so as to provide a diameter which is but slightly greater than the diagonal of the tongue 21; and a thread is then cut in the portion 30 of said counterbored hole. The portion of the hole which extends between the end 28 and the shoulder 29 is then cut out so as to form a rectangular cross section with filleted corners snugly conforming with the cross section of the tongue 21.

The stud 32 comprises a threaded body and a threaded head, said head being tightly screwed into the threaded portion 30 of the socket 27, so that the under side of the head of said stud will be substantially flush with the end 31 of said socket.

The sleeve 33 forms a bearing for the socket 27, said sleeve being slightly shorter than the distance between the shoulder 34 of said socket and the end 31 thereof. The ends of the sleeve 33 are of reduced diameter so that an end of the ferrule 35 and the side wall of the cup-shaped cap 36 may overlap said respective ends; the end overlapped by said ferrule being threaded for attachment thereto, and the end overlapped by the wall of said cap having a groove 37 formed therein for receiving a packing ring 38.

The cap 36 has an opening therethrough which is threaded to fit the body of the stud 32; and one end of said cap has formed therein a cup-shaped recess of such diameter that the wall thereof will cover and provide a running fit for the reduced-diameter end of the sleeve 33. The outside diameter of said cap is substantially the same as that of the intermediate portion of the sleeve 33, and said cap is arranged to form a substantially continuous and smooth surface therewith.

The lock nut 39 is fitted to the threaded body of the stud 32, and serves to hold the cap 36 in intended position thereon.

The ferrule 35 is of substantially the same outside diameter as the intermediate portion of the sleeve 33, and the opening in one end of said ferrule is threaded for engagement by the threaded end of said sleeve. The opening in the other end of said ferrule is tapered and has threads formed therein for suitably engaging an end of the flexible case 40. The length of said ferrule is such that, when the sleeve 33 is secured thereto, the tongue 21 may be withdrawn from said sleeve until the end thereof is flush with the shoulder 29 of said sleeve without causing any part of the head 22 to project from said sleeve.

In assembling the terminal shown, upon the end of a flexible shaft; the end of the core 26 of such a shaft, to which the tongue 21 is to be attached, is fitted to the tapered recess 25 provided in the head 22, and is securely attached thereto, as by soldering. The end of the flexible case 40 is correspondingly fitted into and is secured in position within the tapered opening provided therefor in an end of the ferrule 35.

The stud 32 having been securely set into the threaded end of the socket 27, said socket is inserted into the threaded end of the sleeve 33; the packing ring 38 is then placed in the groove 37 which is provided in the opposite end of said sleeve 33; and the cap 36 is then placed upon the stud 32 in such position that the wall of said cap will project toward said casing, and said cap is tightly set against the end 31 of said socket, thus carrying the wall of said cap over the ring 38. The nut 39 is then placed upon the stud 32 and securely set against the outer face of said cap 36, for which it serves as a lock nut.

The socket 27 is then placed over the end of the tongue 21, and the casing is tightly screwed into the ferrule 35.

The ring 38 is saturated with oil, thereby causing it to expand against the inner wall of the cap 36 so as to provide a dust tight joint.

In use, the driving torque is transmitted between the core 26 and the stud 32 by the engagement of the flat driving faces of the tongue 21 with the flat walls of the rectangular portion of the socket 27; and relative changes in length between the core 26 and the case 40, such as those incident to the bending of the flexible shaft, are compensated for by the slipping of said tongue in and out of said socket.

The symmetrical disposition of the material of both the tongue 21 and the socket 27, with relation to the center of rotation thereof, materially contributes to the steady and quiet operation of this terminal at comparatively high speed, and thereby appreciably decreases wear of bearing surfaces. The symmetrical disposition of the four pairs of co-engaging driving faces of said tongue and socket, with relation to the center of rotation thereof, assures a substantially equal distribution of the stress of the driving torque between such pairs of faces, and facilitates relative lengthwise movement therebetween when operating under load; thus decreasing the wear of such parts incident to use and also decreasing the strain to which the shaft as a whole will be subjected when so flexed, while operating under load, as to tend to cause relative changes in length between the core 26 and the case 40.

I claim and desire to secure by Letters Patent of the United States of America:

The combination with a revoluble flexible shaft and a relatively nonrevoluble flexible case therefor: of a terminal comprising a tongue secured to an end of said shaft, said tongue having a cross section comprising a plurality of fragmentary arcs of like radii and chords joining the ends of said arcs; a socket having a recess into which said tongue projects, such recess being so formed as to freely permit lengthwise movement of said tongue therein, part of the length of such recess having a cross section corresponding with that of said tongue, and the remaining part off the length of such recess having a circular cross section which provides a running fit for the arcs of said tongue; a casing, one end of which is secured to an end of said flexible case and the other end of which has a groove formed therein, said tongue and said socket being contained in said casing; a stud carried by said socket and projecting from said casing; a cap secured to said stud and overlapping the grooved end of said casing; and a packing ring in said groove.

In witness whereof, I hereunto subscribe my name, this 9th day of July 1920.

WINFRED W. ELLIOTT.